US006098265A

United States Patent [19]

Stojkovic et al.

[11] Patent Number: 6,098,265

[45] Date of Patent: Aug. 8, 2000

[54] SETTING FIXTURE

[75] Inventors: Zlatko B. Stojkovic, Brownstown; Larry M. Storinsky, Rochester Hills; Jim Neubacher, Howell; Daryl L. Rothamer, Livonia; Thomas Weber, Birmingham; Don Johnson, Monroe; John D. Dredge, Livonia, all of Mich.; Brad DiTomaso, Windsor, Canada

[73] Assignee: Chrysler Corporation, Auburn Hills, Mich.

[21] Appl. No.: 09/398,899

[22] Filed: Sep. 20, 1999

Related U.S. Application Data

[62] Division of application No. 09/083,991, May 22, 1998, Pat. No. 6,006,635.

[51] Int. Cl.[7] .............................. B25B 27/14; B23Q 3/00

[52] U.S. Cl. ............................................ 29/464; 29/281.5

[58] Field of Search .................................. 29/281.5, 464, 29/281.1, 468

[56] References Cited

U.S. PATENT DOCUMENTS

| | | | |
|---|---|---|---|
| 4,186,476 | 2/1980 | Mair et al. | 29/464 |
| 4,989,313 | 2/1991 | Dzurko et al. | 29/281.5 |
| 5,282,305 | 2/1994 | Nutt et al. | 29/468 |
| 5,694,675 | 12/1997 | Pasternak et al. | 29/468 |
| 5,979,952 | 11/1999 | Dering et al. | 29/468 |
| 6,006,635 | 12/1999 | Stojkovic et al. | 81/484 |
| 6,029,335 | 2/2000 | Hui et al. | 29/464 |

*Primary Examiner*—S. Thomas Hughes
*Assistant Examiner*—Eric Compton
*Attorney, Agent, or Firm*—James R. Yee

[57] ABSTRACT

An apparatus and method for positioning a latch assembly and a striker on a motor vehicle is disclosed. The apparatus is designed to improve the fit of the tailgate to the side walls or truck body. A good fit is defined as the outer surface of the tailgate and the outer surface of the side wall being coplanar when the tailgate is in the closed position. The apparatus, by way of a first formation and first locating element, determines the position of the latch assembly with respect to outer surface of the tailgate. The apparatus, by way of a second formation and second locating element, also determines the location of the striker with respect to the outer surface of the side walls. The apparatus, by way of a body member, also determines the position of the striker with respect to the latch assembly and vice versa. By setting the latch assembly and the striker by the above relations, build variances of the tailgate and of the truck body are eliminated as a possible cause for a poor fit.

2 Claims, 2 Drawing Sheets

SETTING FIXTURE

CROSS-REFERENCE TO RELATED APPLICATIONS

This application is a division of application Ser. No. 09/083,991, filed May 22, 1998 by the same inventor as in the present application, now U.S. Pat. No. 6,006,635.

BACKGROUND OF THE INVENTION

1. Field of the Invention

The present invention relates in general to closure panels, and more specifically to an apparatus and method for use in positioning a latch assembly and a striker in tailgate applications.

2. Discussion

Light and medium duty pick-up trucks are widely used in both rural and urban settings. A pick-up truck contains a bed located aft of the passenger compartment for the transportation of cargo. The bed typically has a floor, body side walls, and a tailgate. The tailgate is an integral part of the pick-up truck, and it is desired that the tailgate be easily positionable between an open position to allow for loading and unloading of cargo and a closed position to secure cargo in the bed. The tailgate is generally pivotally mounted to the truck body side walls of the bed on an axis located at generally the same elevation as the floor of the bed.

Accordingly, tailgates typically have two stationary positions: a closed position and an open or a full down position. When the tailgate is in the closed position, it forms a rear wall to the bed for transportation of cargo in the bed. When the tailgate is in the open position, it is out of the way for loading and unloading cargo and also provides a surface to facilitate loading.

A typical scheme for holding the tailgate in place while in the closed position consists of a latch assembly and a striker. The latch assembly is typically attached to the tailgate and the striker is typically attached to the truck body. Neither are visible when the tailgate is in the closed position. The latch is typically positioned on the inner sheet metal of the tailgate via conically shaped indentations that are formed during the stamping of the tailgate. The sheet metal of the aft ends of the truck body typically have bores adapted to position the strikers. Generally there is a latch mechanism on both lateral ends of the tailgate, operable via a handle at the center of the rear face of the tailgate.

Sheet metal build variations of the sheet metal of the tailgate and the sheet metal of the truck body bed sometimes lead to poor fit of the tailgate in the closed position, for example, where the outer surface of the truck body is not flush with the outer surface of the tailgate when closed. Such a poor fit detrimentally affects such important considerations as closing effort, closing feel, appearance, and noise produced by the tailgate assembly while driving. This poor fit can be reduced by proper alignment of the latch and striker.

An apparatus and method for aligning a latch and a striker is disclosed in U.S. patent application Ser. No. 08/924,363, titled "Method and Tool for Aligning a Striker with a Latch," filed Sep. 5, 1997 and also assigned to Chrysler Corporation, which is hereby incorporated by reference.

SUMMARY OF THE INVENTION

Accordingly, it is a principal objective of the present invention to provide an apparatus for setting a latch and a striker on a tailgate assembly that reduces instances of poor fit between the tailgate and the outer surface of the truck body.

It is another objective of the present invention to provide an apparatus for setting a latch and a striker on a tailgate assembly that reduces instances of a poor fit without imposing unreasonable assembly tolerances on the assembly plant or its workers.

It is yet another objective of the present invention to provide an apparatus for setting a latch and a striker on a tailgate assembly that locates the latch and the striker for assembly with respect to the outer surfaces of the tailgate and the truck body. Such an apparatus allows the outer surface of the tailgate and the outer surface of the truck body to be assembled such that they lie in the same plane.

In one form, the present invention provides an apparatus including a body member having two ends. The first end carries a first formation adapted to contact the outer surface of the tailgate, and the second end carries a second formation that is adapted to contact the outer surface of the truck body. The apparatus has a first locating element associated with the first end to locate either the latch or striker with respect to the outer surface of the tailgate and a second locating element associated with the second end to locate either the latch or striker with respect to the outer surface of the truck body.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
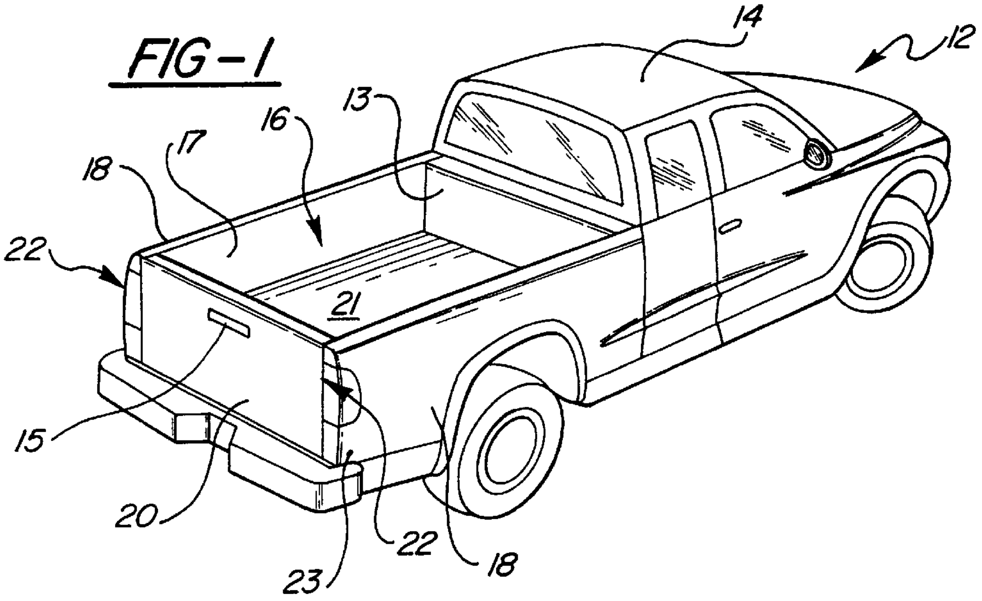
FIG. 1 is a perspective view of a pickup truck having a tailgate assembly with which the apparatus and method of the present invention may be utilized.
Figure 2:
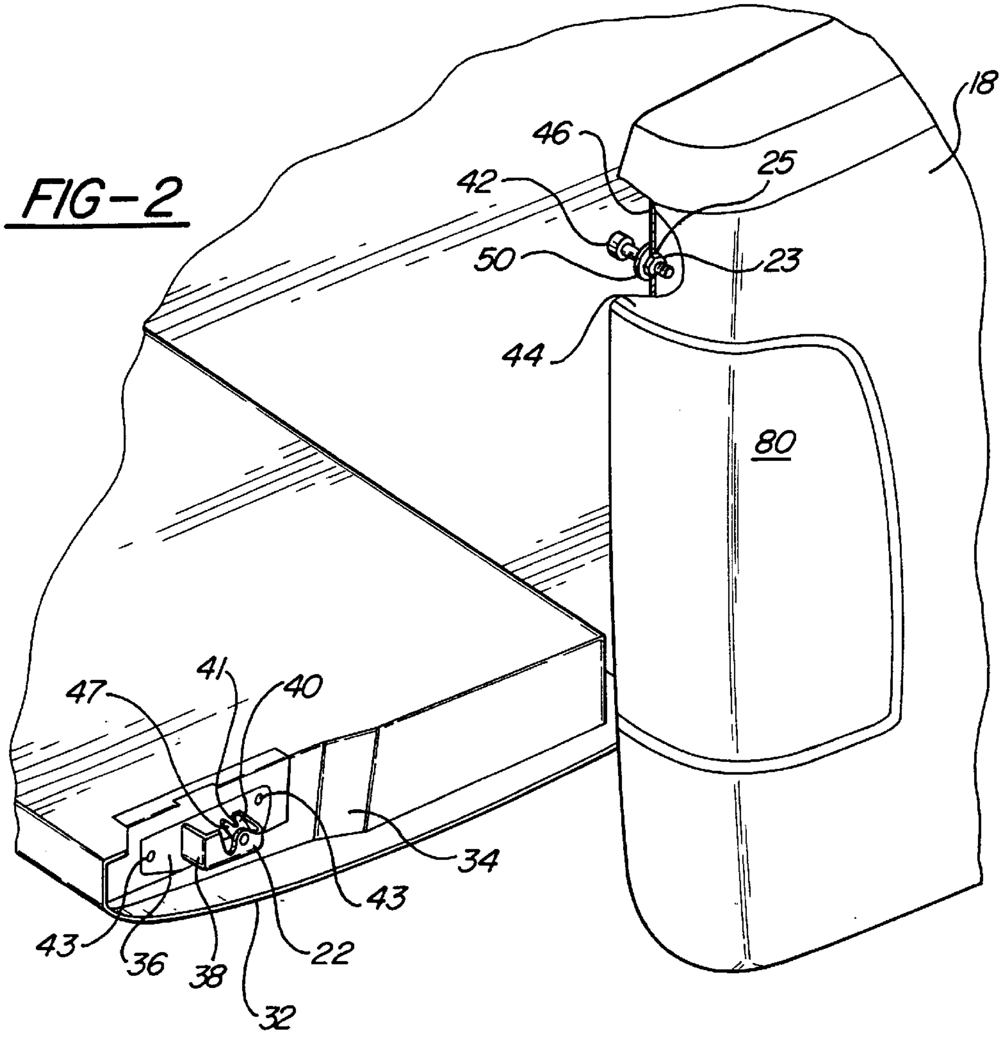
FIG. 2 is a perspective, partially broken view of a tailgate assembly particularly showing a latch and a striker with which the apparatus and method of the present invention may be utilized.

Referring now to the drawings, there is depicted a setting fixture according to the preferred embodiment of the present invention. Turning first to FIG. 1, a pick-up truck 12 is shown. Pick-up truck 12 has passenger compartment 14 and bed 16. Bed 16 is bounded by box 17 with side walls 18, tailgate 20, bed floor 21, and front wall 13. Tailgate 20 is pivotally mounted to truck 12 via hinges 23. This pivoted arrangement allows tailgate 20 to be disposed perpendicular to the surface of bed floor 21. This arrangement is termed the closed position, as is shown in FIG. 1. Tailgate 20 can be pivoted from the closed position to a position parallel with the bed floor 21. This arrangement is termed the open position, as shown in FIG. 2. Any intermediate position between the open position and the closed position is termed a partially open position, and one such position is displayed in FIG. 4.

As is shown in FIG. 2, latch assemblies 22 are shown attached to tailgate 20. Since the latching assemblies on each side of the tailgate 20 are identical, only one will be described in detail. Both are released by apparatus of handle 15. Tailgate 20 comprises an outer surface 32 and the inner surface 34. These surfaces are typically attached by welding or riveting. Latch assembly 22 comprises generally planar surface 36 and housing 38 projecting from surface 36. Latch assembly 22 carries pivot-able horseshoe 40 for reception and engagement of striker 42. Surface 36 is attached to tailgate 20 by screws 43 or other suitable means. Horseshoe 40 is depicted in the unlocked position in FIG. 2. In operation, striker 42 contacts pivot-able horseshoe 40 via groove 41 formed by arm 47 and pivots horseshoe 40 into the locked position. In the locked position, horseshoe 40 is held with arm 47 parallel to tailgate 20. Horseshoe 40 can also be placed in the locked position by physically pivoting horseshoe 40. The locked position is maintained by force provided by a spring or other suitable means (not shown). The spring is disengaged by activation of the tailgate handle 15. Handle 15 is employed to convert horseshoe 40 from the locked position to the unlocked position.

In typical operation, to go from the closed position of tailgate 20 to the open position, handle 15 is activated, thereby pivoting horseshoe 40 into the unlocked position. Tailgate 20 can then be pivoted to the open position as depicted in FIG. 2 to go back to the closed position, from the open position of tailgate 20, tailgate 20 is pivoted into a nearly vertical position where striker 42 contacts horseshoe 40. Striker 42 forces horseshoe 40 into the locked position as tailgate 40 is placed in the closed position. A spring, or other suitable means, acts to hold horseshoe 40 in the locked position until handle 15 is activated again.

As can be seen in FIG. 2, striker 42 is mounted to side wall 18 of pick-up truck 12. Side wall 18 comprises outer surface 44 and inner surface 46. FIG. 2. displays a view of striker 42 provided by the breaking away of both outer surface 44 and inner surface 46. Striker 42 is generally cylindrical in shape and mounted via nut 23 disposed at the outboard end of striker 42. Striker 42 extends through a hole in inner surface 46 with circular flange 50 abutting inner surface 46. Nut 23 retains striker 42 in place against inner surface 46. Hole 25 is slightly larger than the striker 42, allowing for movement during assembly of striker 42 for precise locating with respect to outer surface 44 and latch assembly 22.

Figure 3:
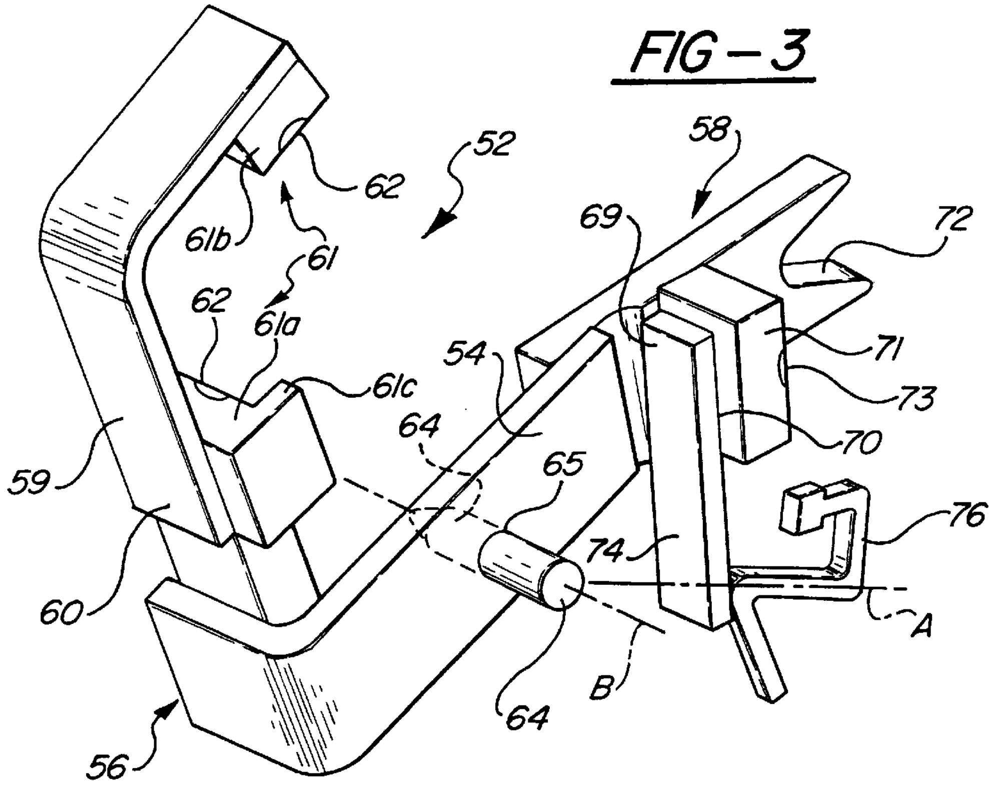
FIG. 3 is a perspective view of the setting fixture of the present invention.

The setting fixture 52 of the present invention is shown in FIG. 3. Fixture 52 has body member 54 with first end 56 and second end 58. First end 56 connects to first formation 60 for contacting the outer surface 32 of tailgate 20. First formation 60 comprises rigid support 59 and a number of pads 61. Pads 61 contain portions of magnetic material 62 embedded therein to hold fixture 52 against outer surface 32 of tailgate 20. Pads 61 create a non-damaging contact with outer surface 32 of tailgate 20. Pad 61*a* is disposed to horizontally align body member 54. Pad 61*b* is disposed to vertically align body member 54 (both directions being relative to tailgate 20 in the closed position). Pad 61*a* includes flange 61*c* disposed perpendicular to pad 61*a,* to laterally align body member 54. It should be appreciated that other numbers of pads than those shown in the preferred embodiment may be used to produce the desired result and are within the meaning and scope of the claimed invention. It should also be noted that the various elements of fixture 52 can be coupled together by any suitable means.

Figure 4:
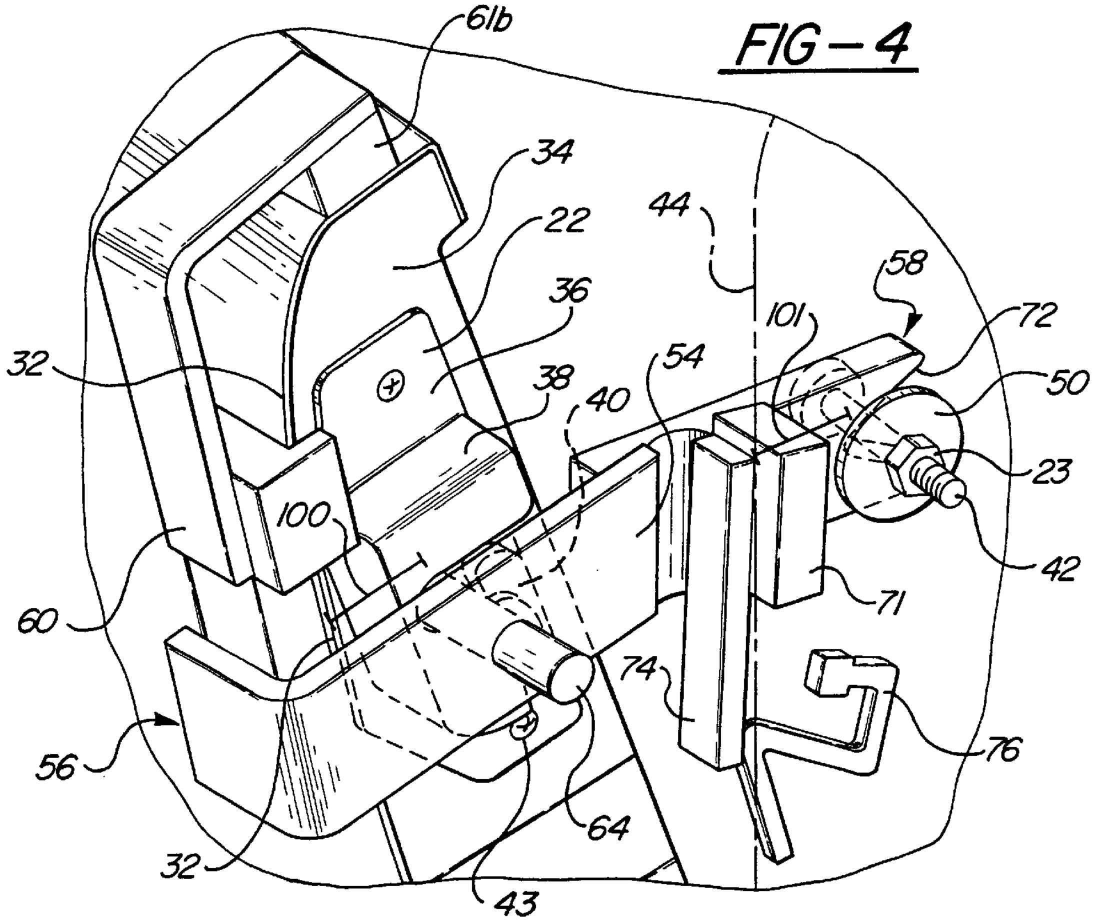
FIG. 4 is a perspective view of the setting fixture of the present invention operatively positioned to install a striker and a latch.

Fixture 52 also comprises an element to locate latching mechanism 22 with respect to the outer surface 32 of tailgate 20, such as in the preferred embodiment shown, where fixture 52 comprises peg 64 which is capable of moving laterally along axis "B" via opening 65. Peg 64 can be best seen in FIG. 3, and has two positions, an install position (not shown) in which peg 64 is disposed such that it does not contact latching mechanism 22, and a contact position, in which peg 64 is disposed in the most laterally inboard position with respect to truck 12, as shown in FIG. 4. Peg 64 is retained in body member 54 in opening 65 via a key and groove type of arrangement (not shown), but it should be appreciated that any arrangement capable of allowing peg 64 to move between the install and contact position is within the scope and meaning of the claimed invention. As shown in FIG. 4, in the contact position peg 64 engages latching mechanism 22 in the same manner as would striker 42 in the closed position, that is, locked between horseshoe 40 and housing 38. Engagement of fixture 52 in this manner eliminates longitudinal, vertical and horizontal variations of latching mechanism positioning with respect to outer surface 32 of tailgate 20 (directions are relative to the closed position of the tailgate) during assembly.

Body member 54 also connects to second end 58 disposed opposite first end 56. Second end 58 connects to second formation 70, which comprises rigid support 69 and pad 71. Pad 71 is adopted to contact outer surface 44 of side wall 18 when operatively positioned to secure latch assembly 22 and striker 42, as shown in FIG. 4. Pad 71 has magnetic material 73 embedded within it to secure pad 71 to the outer surface 44 of the side wall 18. Pad 71 is incorporated in order to create a non-abrasive contact with the outer surface 44 of the side wall 18. Second end 58 also provides an element to properly locate striker 42 with respect to the outer surface 44 of the truck side wall 18. In the present invention, striker 42 is located by v-shaped structure 72 adapted to contact striker 42.

Striker 42 is positioned relative to the outer surface 44 of the side wall 18 and to latch assembly 22 by the aid of fixture 52. By being positioned relative to latch assembly 22, striker 42 is also positioned relative to the outer surface 32 of tailgate 20. All of these positioning requirements are made possible by a suitable shape of body member 54 and suitable locations for attaching first formation 60, second formation 70, peg 64 and v-shaped structure 72 to body member 54.

Projection 74 connects to body member 54 via clamping of the apparatus to the side wall 18. Rotating clamp 76 is adapted to contact a portion of the truck body that is generally parallel with the outer surface 44 of the truck body 18. Rotating clamp 76 connected to projection 74 is capable of rotation about the axis "A" in order to contact the side wall 18 and hold fixture 52 and tailgate 20 in an operable position as shown in FIG. 4. Clamp 76 may be operable in any suitable manner, such as by utilizing aperture 80 (FIG. 2) prior to tail-lamp installation. The clamping means is not necessary to make use of the apparatus and method of the present invention but serves to facilitate such operation. Instead, an operator could hold the tailgate 20 in a partially open position such that the second formation 70 contacts the outer surface of the tailgate structure 44. Magnets 62 and 73 disposed in contact with truck body 18 and/or tailgate 20 could also be used as a form of clamping means. It should be noted that many alternative methods exist to hold tailgate 20 and fixture 52 in place while positioning latch assembly 22 and striker 42 that are within the meaning and scope of the claimed invention.

The operable attachment arrangement is defined as the position such that the first formation 60 contacts outer surface 32 of the tailgate 20 and second formation 70 contacts the outer surface 44 of the side wall 18, as depicted in FIG. 4. In this position, fixture 52 locates latch assembly 22 a specified distance 100 from outer surface 32 of the tailgate 20 (distance is measured from the center of horseshoe 40 to outer surface 32). Fixture 52 also locates striker 42 in specific distance 101 from outer surface 44 of side wall 18 (distance is measured from the center of striker 42 to outer surface 44). It can be appreciated that distances 100 and 101 need to be substantively identical from vehicle to vehicle to make outer surface 32 of tailgate 20 and outer surface 44 of side wall coplanar. Fixture 52, via body member 54, also determines the position of striker 42 with respect to the latch assembly 22 and vice versa.

In operation, and according to the method of the present invention, the apparatus of the present invention is used as follows. First, latch assembly 22 and striker 42 are provided on the inner surface 34 of the tailgate 34 and the inner surface 46 of the side wall 18, respectively. The door is open. Latch assembly 22 and striker 42 are installed but screws 43 of latch assembly 22 and nut 23 of striker 42 are not fully tightened. Next, fixture 52 is placed over tailgate 32 via first formation 60. Tailgate 20 is then raised to an operable position, as shown in FIG. 4. This position forces the second formation 71 to contact the outer surface 44 of the side wall 18. Clamp 76 is then positioned to secure tailgate 20 and fixture 52 in position. Latch assembly 22 positively located with respect to tailgate 20 by the latch locating element, namely peg 64, which is in the contact position. Attachment of latch assembly 22 is made by tightening screws 43 completely. Striker 42 is then positively located by the striker locating element, namely v-shaped structure 72, to side wall 18, and nut 23 is fully tightened. Clamp 76 is then disengaged, and fixture 53 can be removed from tailgate 20. The latch assembly 22 and striker 42 are now in proper position alignment, with outer surface 44 of the side wall 18 and the outer surface 32 of the tailgate 20 coplanar.

The preferred embodiment has been described for use with a tailgate as the closure panel. This invention is applicable for use with other closure panels, such as a door, liftgate or a hood. Such a use is included in the scope of this invention. Moreover, the present invention can also be fully applicable to the reverse of the assembly shown, that is, to a vehicle in which striker 42 is disposed on the tailgate and the latch assembly is disposed on the side wall of the pickup truck.

While the preferred embodiment has been described in accordance with the present invention, it is understood that the invention is susceptible to numerous changes and modifications from those skilled in the art without deviating from the scope and spirit of the following claims.

What is claimed is:

1. A method for attaching a latch assembly and a striker to a motor vehicle having a tailgate with an inner and outer surface comprising:

providing a latch assembly;

providing a striker;

providing a fixture having a first formation and second formation, a first locating element, and a second locating element; loosely installing said latch assembly and said striker in said vehicle;

placing said fixture over said tailgate via said first formation;

raising said tailgate such that said second formation comes into contact with said vehicle;

positively locating said latch assembly in a position dictated by said first locating element; and positively locating said striker in a positioned dictated by said second locating element; and fully attaching said striker and said latch to said vehicle.

2. The method according to claim 1, further comprising using a clamp for securing said fixture to said tailgate, said clamp holding said fixture and said tailgate in an operable position.

* * * * *